(12) United States Patent
Hancock, Sr.

(10) Patent No.: US 8,567,538 B2
(45) Date of Patent: Oct. 29, 2013

(54) VEHICLE HYDRAULIC SYSTEM

(76) Inventor: Leonard H. Hancock, Sr., Hummelstown, PA (US)

( * ) Notice: Subject to any disclaimer, the term of this patent is extended or adjusted under 35 U.S.C. 154(b) by 1497 days.

(21) Appl. No.: 12/110,749

(22) Filed: Apr. 28, 2008

(65) Prior Publication Data

US 2008/0264189 A1  Oct. 30, 2008

Related U.S. Application Data

(60) Provisional application No. 60/926,576, filed on Apr. 27, 2007.

(51) Int. Cl.
*B60K 17/28* (2006.01)

(52) U.S. Cl.
USPC .................. 180/53.1; 180/53.4; 180/53.6

(58) Field of Classification Search
USPC ........ 180/53.1, 53.4, 53.6, 53.61, 53.62, 53.7
See application file for complete search history.

(56) References Cited

U.S. PATENT DOCUMENTS

| | | | | |
|---|---|---|---|---|
| 4,535,859 A | * | 8/1985 | van der Lely | 180/15 |
| 4,618,016 A | * | 10/1986 | van der Lely | 180/53.6 |
| 4,899,525 A | * | 2/1990 | Takei et al. | 56/202 |
| 6,237,708 B1 | * | 5/2001 | Kawada | 180/53.7 |
| 6,722,464 B2 | * | 4/2004 | Nakatani et al. | 180/305 |
| 6,902,017 B2 | * | 6/2005 | Ohashi | 180/53.6 |
| 6,964,310 B2 | * | 11/2005 | Hasegawa | 180/24.09 |
| 7,617,892 B2 | * | 11/2009 | Nishimoto et al. | 180/53.4 |
| 7,841,430 B2 | * | 11/2010 | Shiba | 180/53.4 |
| 7,980,339 B2 | * | 7/2011 | Ishii et al. | 180/53.4 |
| 8,127,872 B2 | * | 3/2012 | Inamori et al. | 180/53.4 |

* cited by examiner

*Primary Examiner* — Toan To
(74) *Attorney, Agent, or Firm* — The Webb Law Firm

(57) ABSTRACT

A hydraulic system includes a split shaft power take off assembly or a transfer case powered by a vehicle drive train. One or more hydraulic pumps are driven by the split shaft power take off assembly or transfer case and supply hydraulic fluid to one or more hydraulic users.

13 Claims, 5 Drawing Sheets

VEHICLE HYDRAULIC SYSTEM

CROSS REFERENCE TO RELATED APPLICATION

This application claims the benefits of U.S. Provisional Application Ser. No. 60/926,576 filed Apr. 27, 2007 and is also related to U.S. application Ser. No. 12/106,568, both of which applications are herein incorporated by reference in their entirety.

BACKGROUND OF THE INVENTION

1. Field of the Invention

This invention relates generally to vehicle hydraulic systems and is particularly useful for emergency and rescue vehicles.

2. Technical Considerations

Some vehicles, such as but not limited to fire or rescue vehicles, have hydraulic systems configured to drive various hydraulic powered components and emergency equipment, such as pumps, generators, valves, motors, hydraulic tools, etc. The hydraulic pumps supplying hydraulic fluid from a reservoir to these hydraulic driven components are typically powered off of the vehicle transmission.

It would be desirable to provide a hydraulic system that maximizes the efficiency of the vehicle. That is, a hydraulic system configured to drive or provide hydraulic power to a number of different types of tools or components.

SUMMARY OF THE INVENTION

A hydraulic system comprises a split shaft power take off assembly operationally connected to the vehicle drive line. A first power take off and a second power take off are connected to the split shaft power take off assembly. At least one hydraulic pump is connected to each power take off for driving at least one piece of auxiliary equipment.

Another hydraulic system comprises a power take off shaft driven by the vehicle drive line. A hydraulic pump is driven by the power take off shaft. A fire pump is driven by the hydraulic pump.

A further hydraulic system comprises a transfer case driven by the vehicle drive line or the vehicle transmission. A plurality of hydraulic pumps is driven by the transfer case. A plurality of auxiliary equipment e.g., hydraulic consumers, are driven by the hydraulic pumps.

An additional hydraulic system comprises a transfer case driven by the vehicle drive line or vehicle transmission. A variable displacement pump is driven by the transfer case. A fire pump is driven by the variable displacement pump.

BRIEF DESCRIPTION OF THE DRAWINGS

Additional advantages and details are explained in greater detail below with reference to the exemplary embodiments illustrated in the accompanying drawing figures in which like reference numbers identify like parts throughout.

DESCRIPTION OF THE PREFERRED EMBODIMENTS

Figure 1:
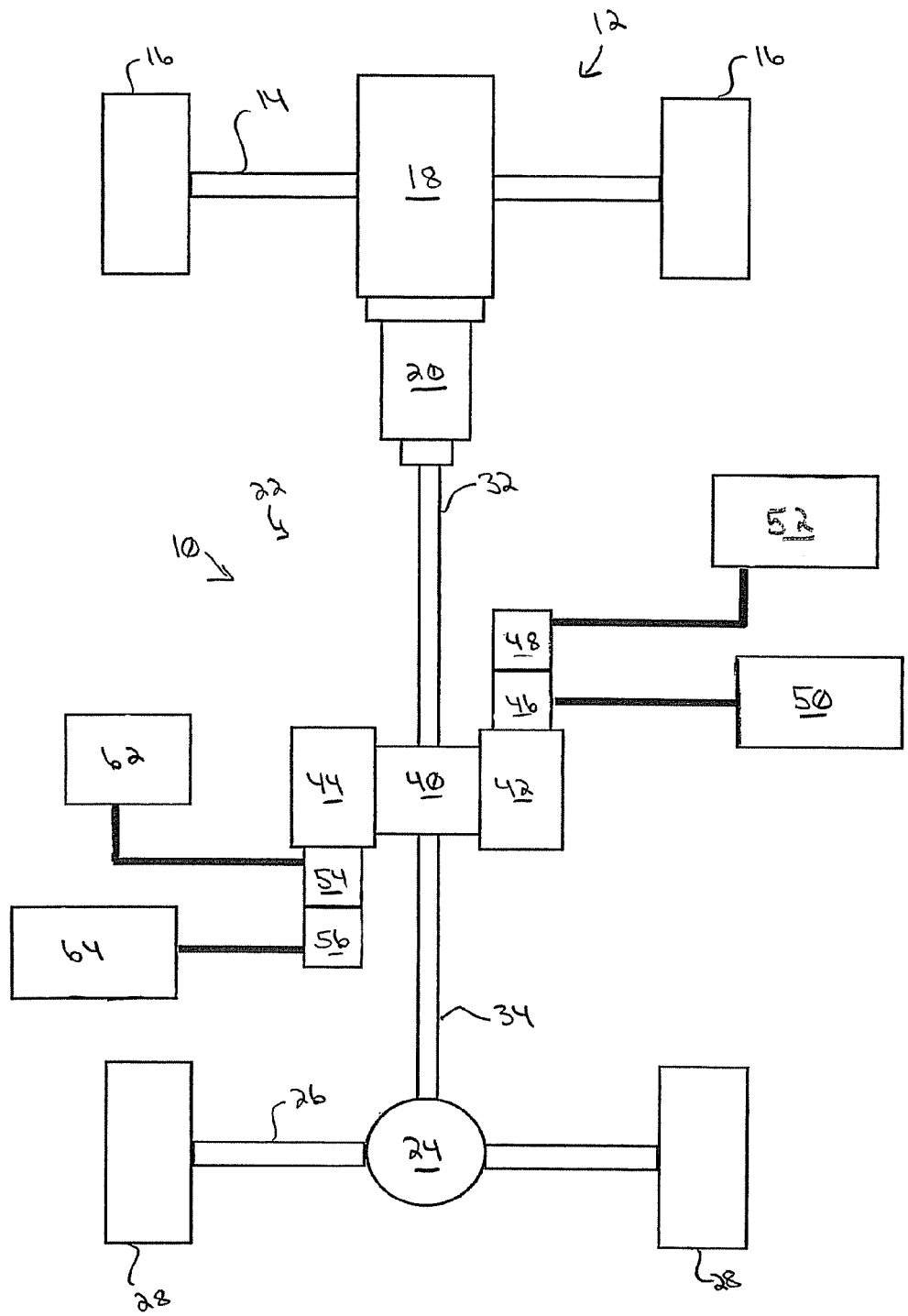
FIG. 1 is a schematic view of a vehicle incorporating a hydraulic system of the invention.

As used herein, spatial or direction terms, such as "up", "down", "above", "below", "left", "right", and the like, relate to the invention as it is shown in the drawing figures. However, it is to be understood that the invention can assume various alternative orientations and, accordingly, such terms are not to be considered as limiting.

An exemplary hydraulic system 10 of the invention incorporated into a vehicle chassis 12 is illustrated in FIG. 1. The components of a typical vehicle chassis 12 will be well understood by one of ordinary skill in the art and, therefore, will not be described in great detail. The vehicle chassis 12 includes a front axle 14 having front wheels 16 attached at the ends of the front axle 14. The chassis 12 supports an engine 18 having a transmission 20. A driveline 22 extends from the transmission 20 to a rear differential 24 connected to a rear axle 26. Rear wheels 28 are connected to the ends of the rear axle 26. In the embodiment shown in FIG. 1, the driveline 22 is divided into a forward drive line 32 and a rear drive line 34.

Examples of vehicles suitable for the invention include, but are not limited to, Class III, IV or V trucks (as designated by the National Truck Equipment Association). One suitable vehicle is a Ford F-550 truck.

A split shaft power take off assembly 40 is connected to the forward and rear drive lines 32, 34. A split shaft power take off assembly 40 allows the hydraulic system to be operated by the vehicle drive train without the vehicle wheels moving. At least one power take off is connected to the split shaft power take off assembly 40. In the illustrated embodiment, a first power take off 42 and a second power take off 44 are connected to the split shaft power take off assembly 40. In the illustrated embodiment, the first power take off 42 drives a first hydraulic pump 46 and a second hydraulic pump 48. The hydraulic pumps can be variable displacement pumps (e.g., swash plate piston pumps) or constant displacement pumps (e.g., piston pumps or gear pumps). The first hydraulic pump 46 supplies hydraulic fluid from a reservoir to one or more first users 50 and the second hydraulic pump 48 provides hydraulic fluid from a reservoir to one or more second users 52. The hydraulic pumps can be driven by a common drive shaft or the drive shafts of the pumps can be connected.

As also shown in FIG. 1, the second power take off 44 powers a third hydraulic pump 54 and a fourth hydraulic pump 56. The third and fourth hydraulic pumps 54, 56 can also be connected to third and fourth hydraulic users 62, 64, respectively. Non-limiting examples of hydraulic users 50, 52, 62, 64 include, but are not limited to, hydraulic tools utilizing high or low pressure, fire pumps, and hydraulic generators to provide electricity to various users. The hydraulic pumps 46, 48, 54, 56 can be connected in series or in parallel.

Figure 2:
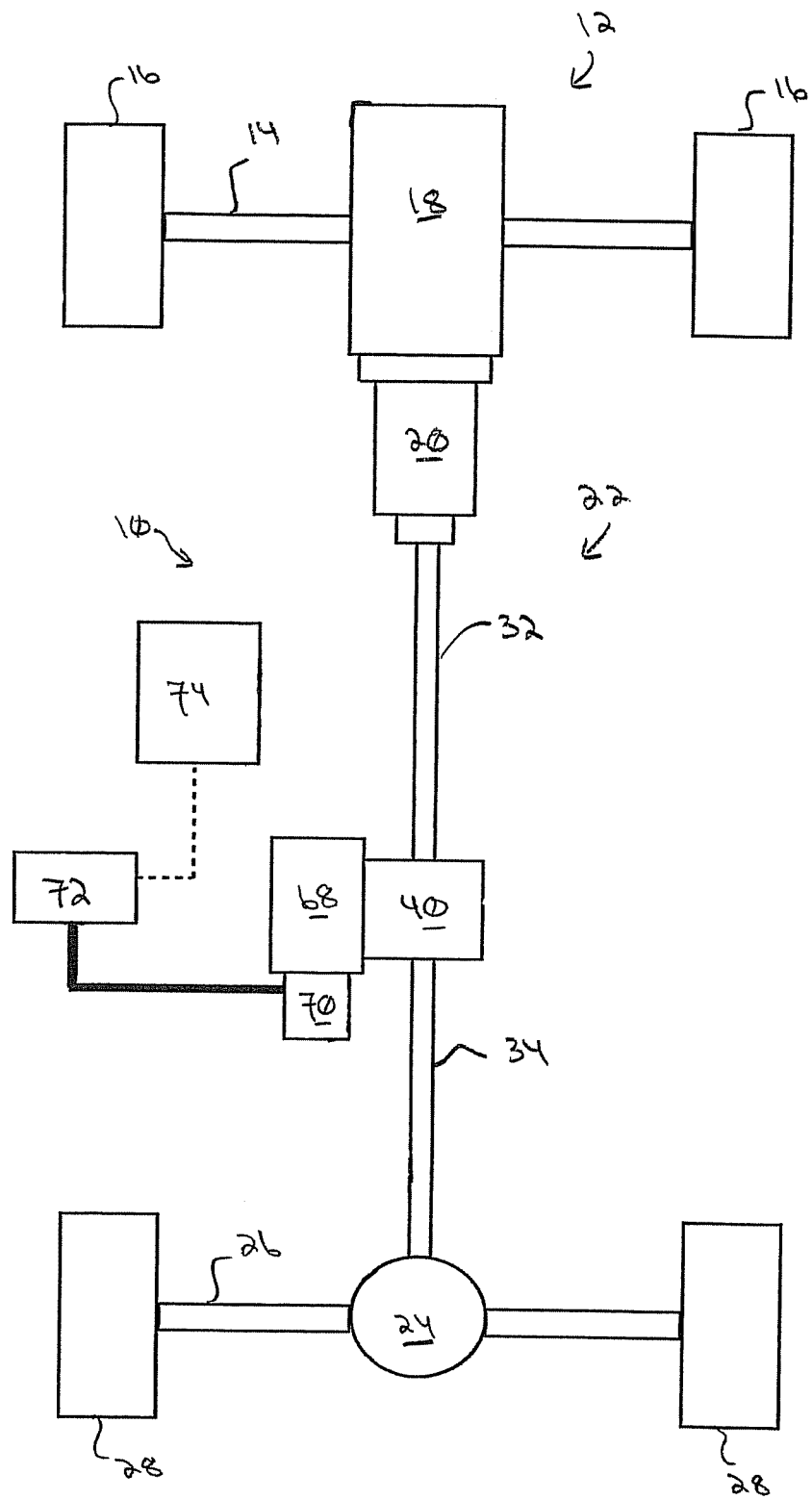
FIG. 2 is a schematic view of another vehicle incorporating a hydraulic system of the invention.

FIG. 2 shows another embodiment of a hydraulic system 10 of the invention in which the split shaft power take off assembly 40 drives a power take off 68. A hydraulic pump 70 is connected to the power take off 68. The hydraulic pump 70 supplies hydraulic fluid to run or power a fire pump 72 and, optionally, one or more other hydraulic components 74, such as but not limited to a salt spreader control valve.

Figure 3:
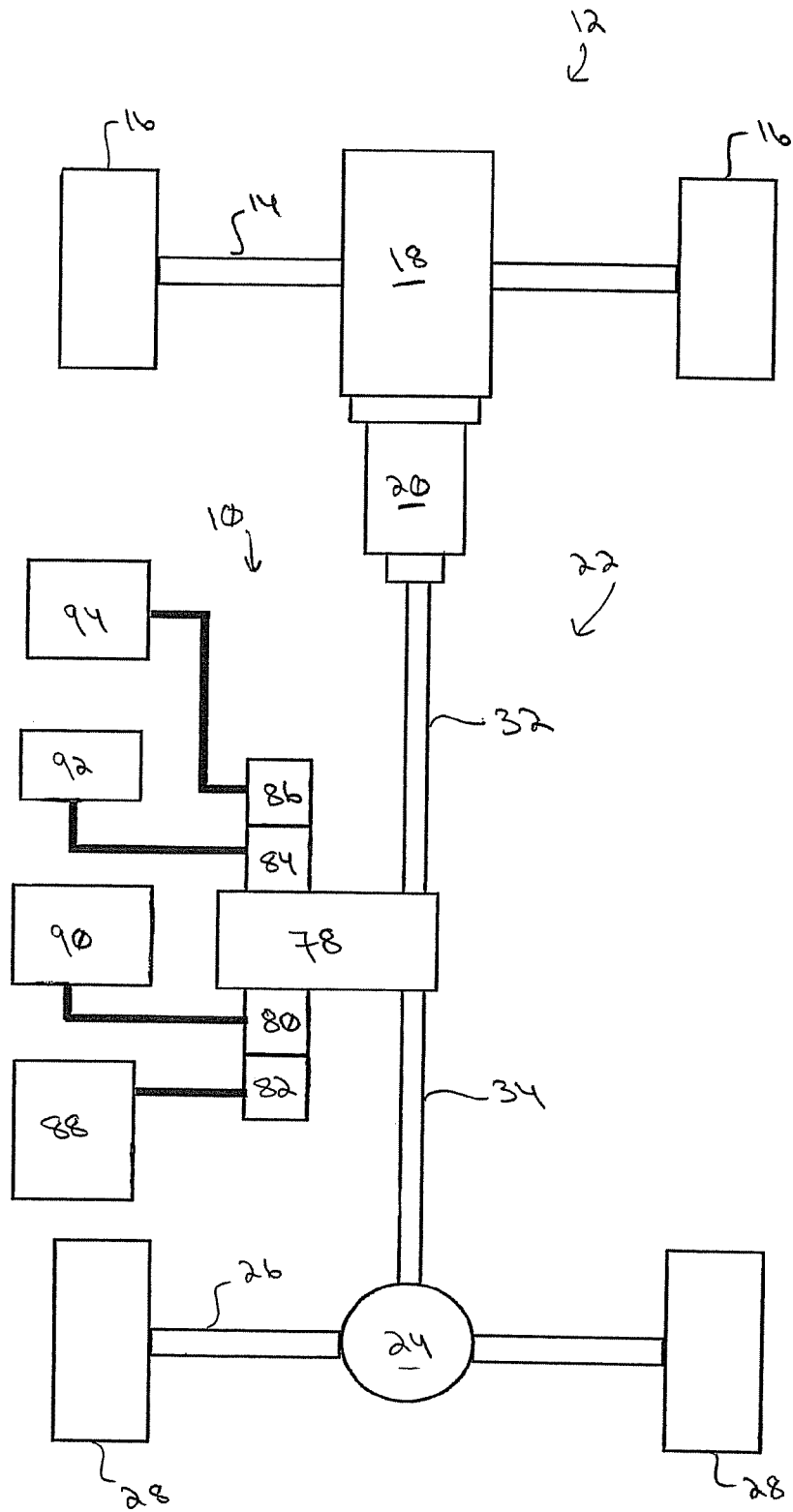
FIG. 3 is a plan view of a further embodiment of a vehicle hydraulic system incorporating features of the invention.

FIG. 3 shows a further embodiment of a vehicle hydraulic system 10 of the invention. However, in this embodiment, a transfer case 78 is used rather than a split shaft power take off assembly 40. The transfer case 78, which is in addition to the vehicle transfer case, can be directly mounted to the vehicle transmission 20 or, as shown in FIG. 3, can obtain power from rotation of the vehicle drive shaft. For example, the transfer case 78 can be connected to the forward and rear drive lines 32, 34 and powered thereby. A plurality of hydraulic pumps are connected to the transfer case 78. In the illustrated embodiment, a first pump 80 and a second pump 82 are connected to one side of the transfer case 78 and a third pump 84 and a fourth pump 86 are connected to another side of the transfer case 78. The pumps, 80-86 can provide hydraulic fluid from a reservoir to various hydraulic users 88, 90, 92, 94, such as but not limited to hydraulic tools, fire pumps, generators, and salt spreader control valves, just to name a few.

Figure 4:
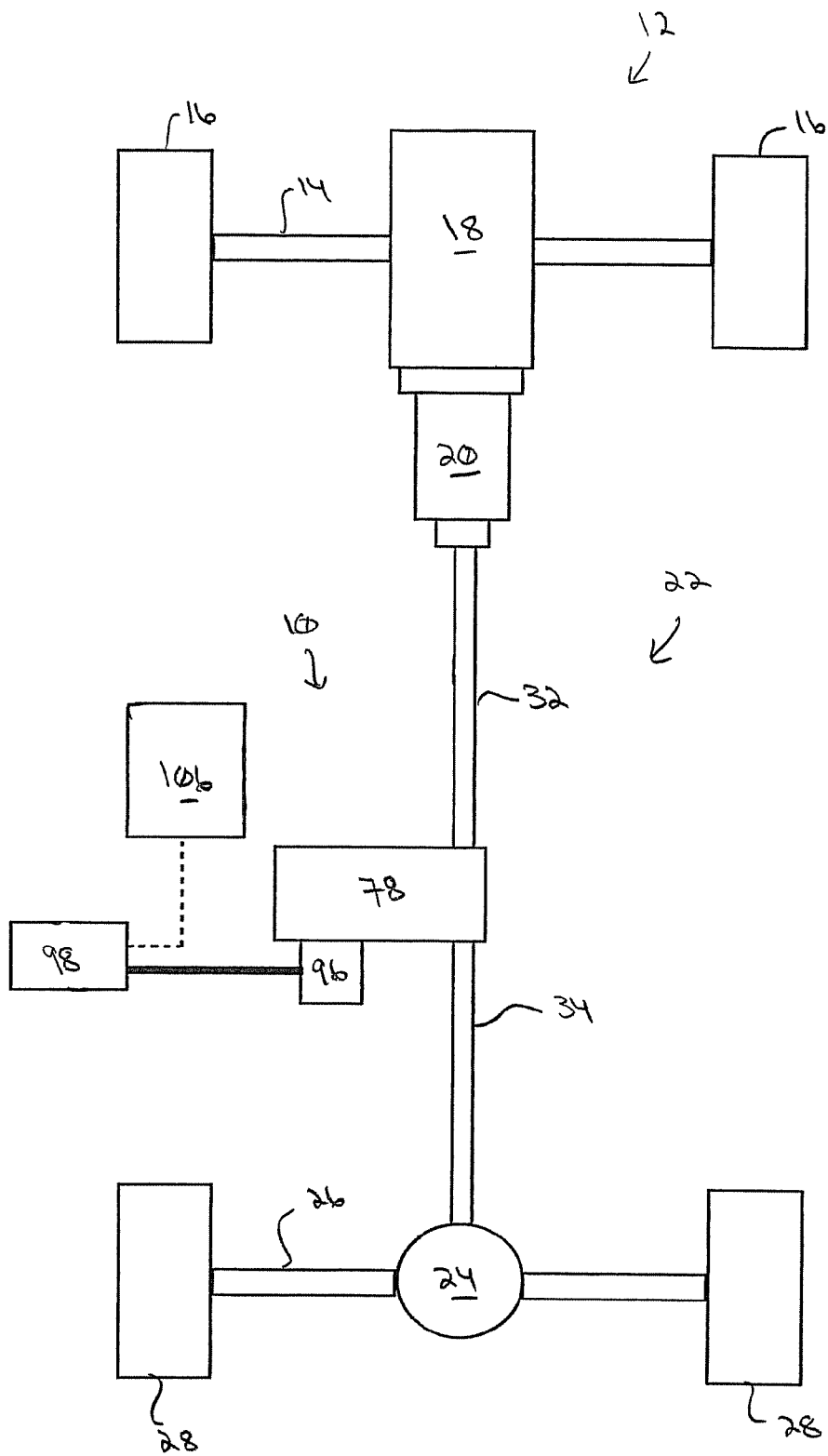
FIG. 4 is a schematic view of an additional vehicle hydraulic system incorporating features of the invention.

FIG. 4 shows another hydraulic system 10 of the invention in which the transfer case 78 powers a hydraulic pump 96 which supplies hydraulic fluid to power a fire pump 98 and, optionally, one or more additional hydraulic users 106, such as but not limited to a salt spreader control valve.

Figure 5:
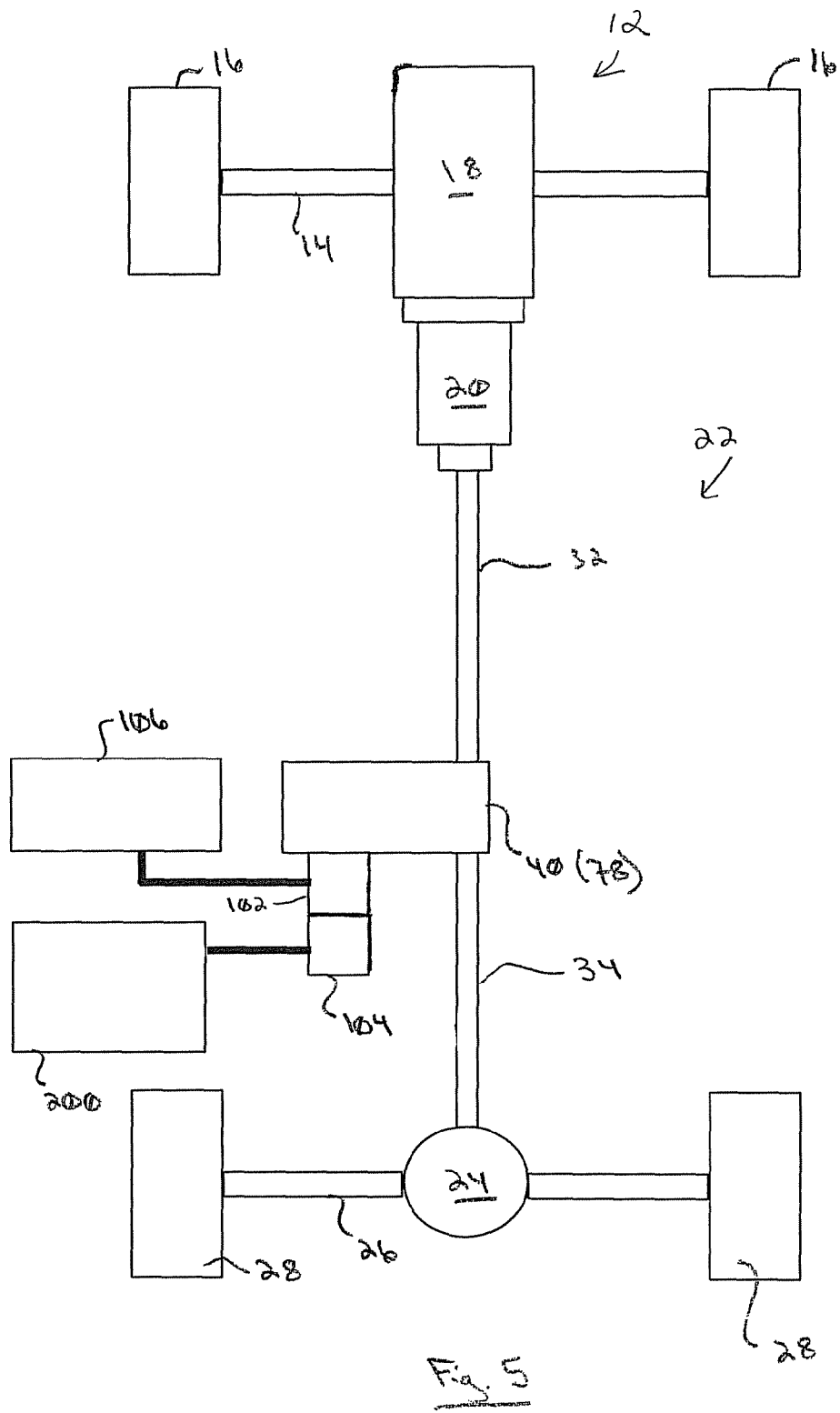
FIG. 5 is a schematic view of a vehicle hydraulic system of the invention driving a fire pump.

FIG. 5 is a further embodiment of a hydraulic system 10 of the invention in which either a split shaft power take off assembly 40 or transfer case 78 is connected to the vehicle drive train as discussed above. In this embodiment, a variable displacement pump 102 and a constant displacement pump 104 are connected in series. The variable displacement pump 102 can be used to power a hydraulic user, such as a fire pump 106 (for example, by driving a hydraulic motor that drives the fire pump 106). The constant displacement pump 104 is used to power a hydraulic user 200, such as a salt spreader or other hydraulic user. In this embodiment, the speed of the engine 18 can be maintained at a constant setting and the variable displacement pump 102 can be varied to change the displacement (i.e., speed up or slow down) to drive the fire pump 106 while the constant displacement pump 104 maintains its output. That is, since the drive shafts of the variable displacement pump 102 and constant displacement pump 104 are connected, changing the displacement of the variable displacement pump 102 does not affect the output of the constant displacement pump 104. The variable displacement pump 102 can be electronically controlled to maintain the fire pump 106 at a predetermined output pressure. The vehicle engine 18 can be set and maintained at a specific RPM at which the engine will produce a desired torque and power (for example maximum torque rise and/or maximum power output). Since the system can be designed to operate at optimal torque and horsepower, the hydraulic system 10 of the invention can provide faster system response times while flow and pressure outputs are also optimized allowing a broader range of operating flows and pressures. Additionally, in the hydraulic system 10, high pressure hydraulic circuitry can be driven from the drive shaft (e.g. split shaft power take off assembly) not drawn from a vehicle transmission-mounted power take off, as was previously done. Additionally, the hydraulic system 10 has the advantage that the hydraulic system 10 can be operated while the vehicle is moving or stationary. In an additional embodiment, when a transfer case 78 is used, the associated hydraulic pumps can be attached directly to the transfer case 78 or can be connected by a driveshaft and/or coupling. While in the above embodiment, the variable displacement pump 102 was connected to the power take off 40 and the constant displacement pump 104 was connected to the variable displacement pump 102, it is to be understood that the pumps could be connected in any order.

It will be readily appreciated by those skilled in the art that modifications may be made to the invention without departing from the concepts disclosed in the foregoing description. For example, it is to be understood that any combination of variable displacement and constant displacement pumps could be used in a variety of configurations. Accordingly, the particular embodiments described in detail herein are illustrative only and are not limiting to the scope of the invention, which is to be given the full breadth of the appended claims and any and all equivalents thereof.

What is claimed is:

1. A vehicle hydraulic system, comprising:
   a split shaft power take off assembly operationally connected to a vehicle drive line;
   a first power take off and a second power take off connected to the split shaft power take off assembly; and
   at least one hydraulic pump connected to each power take off for driving at least one hydraulic consumer, wherein the at least one hydraulic pump is selected from the group consisting of a variable displacement pump and a constant displacement pump.

2. The hydraulic system according to claim 1, wherein the first power take off drives first and second hydraulic pumps.

3. The hydraulic system according to claim 1, wherein the second power take off drives third and fourth hydraulic pumps.

4. The hydraulic system according to claim 1, including at least one set of hydraulic pumps, wherein in the at least one set of hydraulic pumps the pumps are connected in series.

5. The hydraulic system according to claim 1, wherein the power take off drives a variable displacement pump and the variable displacement pump drives a constant displacement pump.

6. The hydraulic system according to claim 1, wherein the at least one hydraulic consumer comprises a fire pump.

7. The hydraulic system according to claim 6, wherein the at least one hydraulic pump driving the fire pump is a variable displacement pump.

8. A vehicle hydraulic system, comprising:
   a split shaft power take off assembly;
   at least one power take off connected to the split shaft power take off assembly;
   a first hydraulic pump connected to the power take off;
   a second hydraulic pump connected to the first hydraulic pump;
   a first hydraulic user connected to the first hydraulic pump; and
   a second hydraulic user connected to the second hydraulic pump,
   wherein at least one of the first or second hydraulic users comprises a fire pump, and wherein another of the first or second hydraulic users is selected from the group consisting of a hydraulic tool and a hydraulic generator.

9. The hydraulic system of claim 8, wherein at least one of the first and second hydraulic pumps is a variable displacement pump.

10. The hydraulic system of claim 8, wherein at least one of the first and second hydraulic pumps is a constant displacement pump.

11. The hydraulic system of claim 8, wherein the first and second hydraulic pumps are connected in series.

12. The hydraulic system of claim 8, wherein the hydraulic pump connected to the fire pump is a variable displacement pump.

13. The hydraulic system of claim 8, further comprising:
   at least one second take off connected to the split shaft power take off assembly;
   a third hydraulic pump connected to the second power take off;
   a fourth hydraulic pump connected to the third hydraulic pump;

a third hydraulic user connected to the third hydraulic pump; and a fourth hydraulic user connected to the fourth hydraulic pump, wherein at least one of the third or fourth hydraulic users is selected from the group consisting of a fire pump, a hydraulic tool, and a hydraulic generator.

* * * * *